United States Patent [19]

Hanson

[11] Patent Number: 4,903,500
[45] Date of Patent: Feb. 27, 1990

[54] METHODS AND APPARATUS FOR DETECTING THE NEED TO DEFROST AN EVAPORATOR COIL

[75] Inventor: Jay L. Hanson, Bloomington, Minn.

[73] Assignee: Thermo King Corporation, Minneapolis, Minn.

[21] Appl. No.: 364,934

[22] Filed: Jun. 12, 1989

[51] Int. Cl.⁴ .................................. F25D 21/06
[52] U.S. Cl. ............................ 62/156; 62/155; 62/160
[58] Field of Search ............ 62/156, 155, 151, 157, 62/158, 140, 234, 229, 160; 165/17

[56] References Cited

U.S. PATENT DOCUMENTS

| | | |
|---|---|---|
| 3,839,878 | 10/1974 | Tilmanis . |
| 4,209,994 | 7/1980 | Mueller et al. . |
| 4,215,554 | 8/1980 | Pohl . |
| 4,251,988 | 2/1981 | Allard et al. ............... 62/234 X |
| 4,338,790 | 7/1982 | Saunders et al. ............ 62/156 X |
| 4,345,441 | 8/1982 | Hansen . |
| 4,400,949 | 8/1983 | Kinoshita et al. . |
| 4,432,211 | 2/1984 | Oishi et al. ................ 62/156 X |
| 4,563,877 | 1/1986 | Harnish . |
| 4,573,326 | 3/1986 | Sulfstede et al. . |
| 4,590,771 | 5/1986 | Shaffer et al. . |
| 4,627,245 | 12/1986 | Levine ....................... 62/157 |
| 4,646,529 | 3/1987 | Hanson . |
| 4,662,184 | 5/1987 | Pohl et al. . |
| 4,663,941 | 5/1987 | Janke . |
| 4,689,965 | 9/1987 | Janke et al. ................ 62/155 |

Primary Examiner—Harry B. Tanner
Attorney, Agent, or Firm—D. R. Lackey

[57] ABSTRACT

Defrost control, and a method of determining the need for defrost, of a transport refrigeration system which includes an evaporator coil disposed in an air flow path which returns air from a served space and discharges conditioned air back into the served space. The temperature of the air in the served space is measured by a digital thermostat for comparison with a preselected set point temperature, and the refrigeration system is operated with heating and cooling cycles to cause the temperature of the air to track set point. The digital temperature signal is monitored by the defrost control during each cooling cycle, and defrost of the evaporator coil is initiated as a function of the direction and rate of change of the air temperature.

6 Claims, 4 Drawing Sheets

| MODE-TEMPERATURE FALLING | DIGITAL SIGNAL MSB | | | | | | | LSB | WORD # | |
|---|---|---|---|---|---|---|---|---|---|---|
| | A | B | C | D | E | F | G | H | | |
| | 0 | 0 | 0 | 0 | 0 | 0 | 0 | 0 | 1 | HIGH SPEED COOL |
| HIGH SPEED COOL | 0 | 1 | 1 | 0 | 1 | 0 | 0 | 0 | 104 | |
| | 0 | 1 | 1 | 0 | 1 | 0 | 0 | 1 | 105 | |
| | 0 | 1 | 1 | 0 | 1 | 0 | 1 | 0 | 106 | |
| | 0 | 1 | 1 | 0 | 1 | 0 | 1 | 1 | 107 | |
| | 0 | 1 | 1 | 0 | 1 | 1 | 0 | 0 | 108 | |
| | 0 | 1 | 1 | 0 | 1 | 1 | 0 | 1 | 109 | |
| | 0 | 1 | 1 | 0 | 1 | 1 | 1 | 0 | 110 | LOW SPEED COOL |
| | 0 | 1 | 1 | 0 | 1 | 1 | 1 | 1 | 111 | |
| | 0 | 1 | 1 | 1 | 0 | 0 | 0 | 0 | 112 | |
| | 0 | 1 | 1 | 1 | 0 | 0 | 0 | 1 | 113 | |
| | 0 | 1 | 1 | 1 | 0 | 0 | 1 | 0 | 114 | |
| | 0 | 1 | 1 | 1 | 0 | 0 | 1 | 1 | 115 | |
| | 0 | 1 | 1 | 1 | 0 | 1 | 0 | 0 | 116 | |
| | 0 | 1 | 1 | 1 | 0 | 1 | 0 | 1 | 117 | |
| | 0 | 1 | 1 | 1 | 0 | 1 | 1 | 0 | 118 | |
| LOW SPEED COOL | 0 | 1 | 1 | 1 | 0 | 1 | 1 | 1 | 119 | |
| | 0 | 1 | 1 | 1 | 1 | 0 | 0 | 0 | 120 | |
| | 0 | 1 | 1 | 1 | 1 | 0 | 0 | 1 | 121 | |
| | 0 | 1 | 1 | 1 | 1 | 0 | 1 | 0 | 122 | |
| | 0 | 1 | 1 | 1 | 1 | 0 | 1 | 1 | 123 | HEAT |
| | 0 | 1 | 1 | 1 | 1 | 1 | 0 | 0 | 124 | |
| | 0 | 1 | 1 | 1 | 1 | 1 | 0 | 1 | 125 | |
| | 0 | 1 | 1 | 1 | 1 | 1 | 1 | 0 | 126 | |
| | 0 | 1 | 1 | 1 | 1 | 1 | 1 | 1 | 127 | |
| HEAT | 1 | 0 | 0 | 0 | 0 | 0 | 0 | 0 | 128 | SET POINT |
| | 1 | 1 | 1 | 1 | 1 | 1 | 1 | 1 | 256 | MODE-TEMPERATURE RISING |

+5.1° (at word 104)
+3.4° (at word 112)
+1.7° (at word 120)

FIG. 2

METHODS AND APPARATUS FOR DETECTING THE NEED TO DEFROST AN EVAPORATOR COIL

TECHNICAL FIELD

The invention relates in general to refrigeration systems, and more specifically to methods and apparatus for detecting the need to defrost an evaporator coil of a transport refrigeration system.

BACKGROUND ART

Prior art evaporator defrosting methods and apparatus include such concepts as initiating defrost as a function of time, as a function of air flow through the evaporator coil, as a function of frost thickness, as a function of the differential between coil temperature and the temperature of a served space, and the like. If defrost is based upon some arbitrary value, such as time, then in certain instances defrosting may occur too often, or not often enough, resulting in inefficient operation.

If defrost is based upon need, some sort of additional sensor is usually required, which adds to the cost and maintenance of the defrost apparatus.

SUMMARY OF THE INVENTION

Briefly, the present invention includes methods and apparatus for detecting the actual need to defrost a transport refrigeration system which, for example, may maintain a predetermined set point temperature by operating with heating and cooling cycles, which usually include low and high speed cooling modes and low and high speed heating modes. The need-for-defrost detection utilizes a thermostat which is already provided in a transport refrigeration system to control the temperature of a served space. Digital thermostats are now being used to provide a digital signal indicative of the temperature of a served space, and the invention is directed to transport refrigeration systems which use a digital thermostat.

The bit pattern change of the digital signal is monitored during each cooling cycle of the associated transport refrigeration unit to detect the direction of temperature change, and certain bit change pattern changes are used to trigger a reset signal for a timer.

When the temperature of a served space is dropping at an acceptable rate towards a predetermined set point temperature during a cooling cycle, it indicates efficient operation which is achieved only when the evaporator coil does not have an excess frost build up. The timer is reset during this condition, and no defrost signal is provided. If the evaporator coil is not over burdened with frost, the unit will cycle back and forth between heating and cooling to hold set point, and the timer is reset during each heating cycle, preventing timeout of the timer.

When the evaporator coil needs defrosting, operation is inefficient and the air temperature of the served space will not drop at the proper rate towards set point; or set point will not be reached, with the temperature stalling in the low speed cool mode without reaching set point and without going into a heating cycle; or the temperature of the served space may rise through the low speed cool temperature range until the high speed cool temperature range is reached, at which time the increased capacity of the refrigeration system provided by the high speed cool mode will reduce the temperature back into the low speed cool range. If the temperature of the air indicative of the temperature of the served space is not dropping towards set point at the desired rate, or the system is not cycling back and forth between heating and cooling, or the temperature of the air is rising away from set point, the timer reset pulses will not be generated, allowing the timer to time-out. Timeout of the timer results in the generation of a defrost pulse, which when applied to the defrost control circuits of the transport refrigeration system initiates defrost of the evaporator coil.

BRIEF DESCRIPTION OF THE DRAWINGS

The invention will become more apparent by reading the following detailed description in conjunction with the drawings which are shown by way of example only, wherein:

FIG. 2 sets forth an exemplary digital algorithm which may be used to control the transport refrigeration system shown in FIG. 1, with the defrost control of the invention being responsive to predetermined bit change patterns of the digital signal;

DESCRIPTION OF PREFERRED EMBODIMENTS

Figure 1:
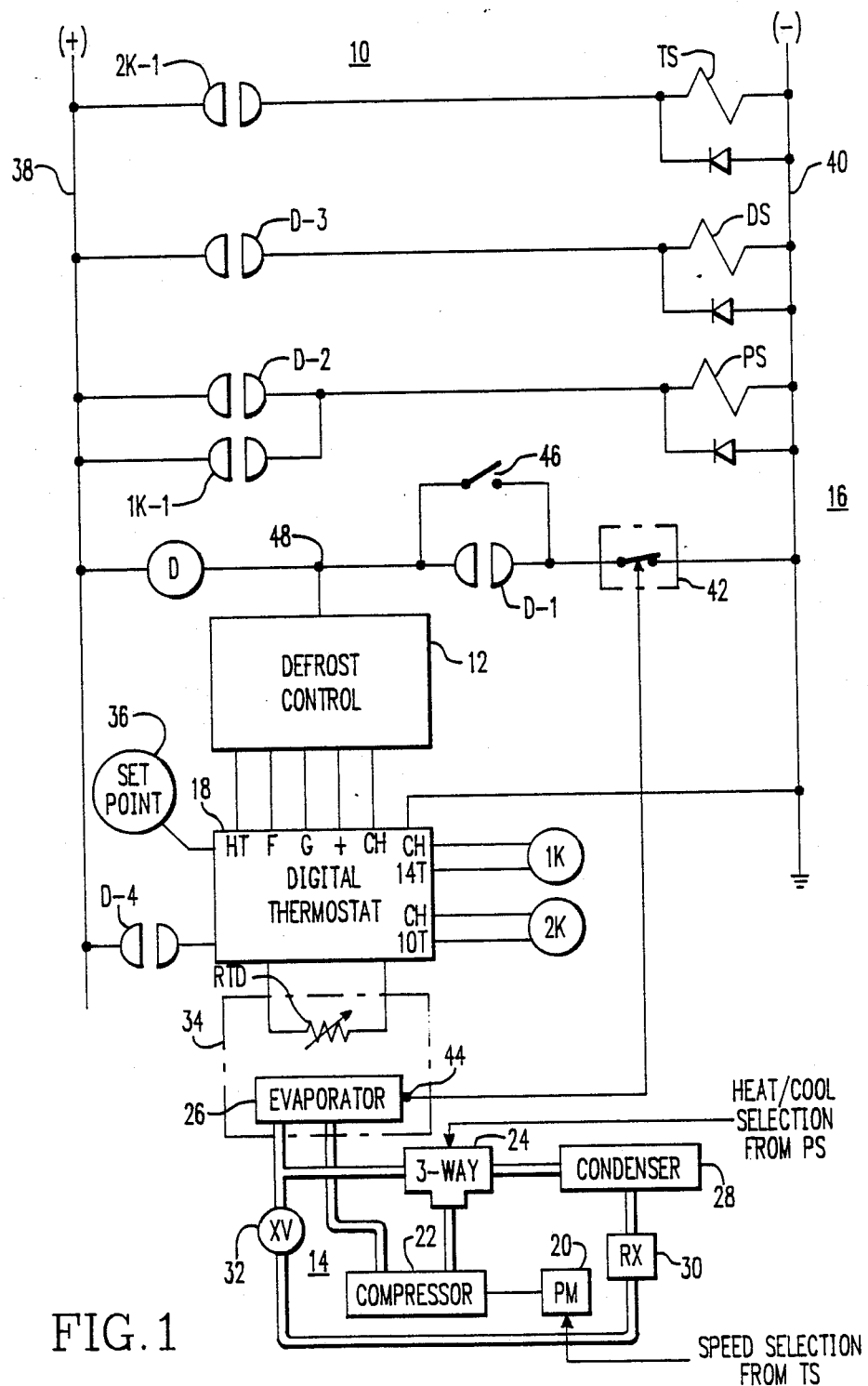
FIG. 1 is a schematic diagram of a transport refrigeration system which may utilize the defrost methods and apparatus of the invention.

Referring now to the drawings, and to FIG. 1 in particular, there is shown a transport refrigeration system 10 which may utilize defrost control 12 constructed according to the methods and teachings of the invention. A refrigerant portion 14 of transport refrigeration system 10, which may be conventional, is illustrated in block form. For example, refrigerant portion 14 may be any of the transport refrigeration systems shown in U.S. Pat. Nos. 3,219,102; 4,325,224; and 4,419,866, which are assigned to the same assignee as the present application, and these patents are hereby incorporated into the specification of the present application by reference. For purposes of the present application it is sufficient to illustrate a control portion 16 of transport refrigeration system 10, with control portion 16 illustrating how the defrost control 12 of the present invention may be integrated with a defrost function of the incorporated patents.

Transport refrigeration system 10 includes a digital thermostat 18, such as shown and described in detail in my U.S. Pat. No. 4,819,441 copending application Ser. No. 236,878 filed and Aug. 26,, 1988, and this patent and patent application are hereby incorporated into the specification of the present application by reference.

Transport refrigeration system 14 includes a prime mover 20, such as a Diesel engine, which is operable in continuous or start-stop modes at a selected one of high and low speeds, such as 2200 RPM and 1400 RPM, respectively. Speed selection is responsive to a throttle solenoid TS, the control of which will be hereinafter described.

The prime mover 20 drives a refrigerant compressor 22, with compressor 22 providing hot refrigerant gas to a three-way valve 24 from a discharge port. In a cooling position of three-way valve 24, the hot gas is directed to an evaporator coil 26 via a condenser 28, a receiver 30 and an expansion valve 32. The evaporator 26 returns refrigerant to a suction port of compressor 22. In a heating position of three-way valve 24, hot refrigerant gas flows through evaporator 26 and back to compressor 22. The heating and cooling positions are selected by a pilot solenoid PS, the control of which will be hereinafter explained.

Evaporator coil 26 is disposed in an air path associated with a served space shown generally at 34, with an evaporator blower (not shown) drawing air from served space 34, passing it through evaporator coil 26, and returning the conditioned air to the served space 34.

Digital thermostat 18 includes a temperature sensor RTD disposed to detect the temperature of the served space 34, such as in the return air path from the served space 34 to the evaporator coil 26. A set point temperature selector 36 provides an indication of the desired temperature of the served space 34 to thermostat 18. Digital thermostat 18 compares the actual temperature sensed by sensor RTD with the desired temperature from set point selector 36 and provides signals for a heat relay 1K and a speed relay 2K to cause the actual temperature to be as close as possible to the desired or set point temperature. When relay 1K is de-energized, a cooling cycle is selected, and when it is energized a heating cycle is selected. When relay 2K is de-energized the low speed of prime mover 20 is selected, and when relay 2K is energized, the high speed of prime mover 20 is selected The heat relay 1K has a normally open contact 1K-1 disposed to energize pilot solenoid PS via power supply conductors 38 and 40 when relay 1K is energized. The pilot solenoid PS, when energized, operates three-way valve 24 to select the heating mode of transport refrigeration system 10. When pilot solenoid is de-energized, the three-way valve 24 switches back to select the cooling mode.

The speed relay has a normally open contact 2K-1 disposed to energize throttle solenoid TS via conductors 38 and 40 when relay 2K is energized. The throttle solenoid TS selects the high speed operation of prime mover 20 when energized, and the low speed operation when de-energized.

A defrost relay D is connected between conductors 38 and 40 via a normally open contact D-1 of defrost relay D and a defrost termination switch 42. Defrost termination switch 42 has a sensor 44 which responds to the temperature of the evaporator coil 26, with switch 42 being closed until the temperature of the evaporator coil rises to a predetermined temperature during defrost, such as 54 degrees F. A manual defrost operation may be initiated by closing a momentary contact switch 46 connected across normally open contact D-1. Closing switch 46 energizes the defrost relay D, closing its contact D-1 to seal in relay D until the defrost termination switch 42 opens to signify that the defrost operation should terminate. Defrost relay D has a normally open contact D-2 connected to energize the pilot solenoid PS when relay D is energized, to select the heating mode. Defrost relay D has a normally open contact D-3 connected to energize a damper solenoid DS when relay D is energized, which closes evaporator coil dampers in the air flow path, preventing warm air during defrost from being discharged into served space 34. Finally, defrost relay D has a normally open contact D-4 connected to digital thermostat 18. When contact D-4 closes, digital thermostat 18 energizes speed relay 2K, selecting the high speed operation of prime mover 20.

Defrost control 12 is connected to one side of the defrost relay D, i.e., at junction 48, and to the digital thermostat 18. When defrost control 12 detects a need to defrost evaporator coil 26, it provides a momentary contact closure to power supply conductor 40, energizing defrost relay D, which then initiates the defrost operation, as described relative to a momentary closure of manual switch 46.

FIG. 2 is a digital algorithm which illustrates an 8-bit digital signal A-H, with bit A being the most significant bit MSB and bit H being the least significant bit LSB. In the example shown, each 0.2125 degree F change of temperature of the served space results in a toggle of the digital signal from one digital value to the next. During temperature pull down, system 10 operates in high speed cool until the digital signal A-H reaches word #112, signifying that the temperature of the served space is +3.4 degrees F. above set point. System 10 then operates in low speed cool until the temperature of the served space 34 reaches set point. Set point is word #128. As the digital signal changes from word #127 to word #128, the MSB changes from a "zero" to a "one", and system 10 switches from low speed cool to low speed heat; or, in some systems, from low speed cool to a null mode, such as by shutting down the prime mover 20. Once the system 10 goes into low speed heat, or null, a built-in hysteresis keeps the system in low speed heat, or null, as the temperature rises, until reaching +1.7 degrees F. above set point, at which time system 10 switches back to low speed cool. If low speed cool is not sufficient to keep 10 the temperature of the served space from rising to +5.1 degree F. above set point, system 10 will switch to high speed cool.

Defrost control 12 utilizes certain signals provided by digital thermostat 18, including bits F and G of digital signal A-H, and signal HT which is true from set point and below during a falling temperature, and up through digital word #120 when the temperature rises above set point. In addition to these signals from thermostat 18, defrost control 12 derives its electrical control power from thermostat 18, via outputs + and CH of thermostat 18.

Figure 3:
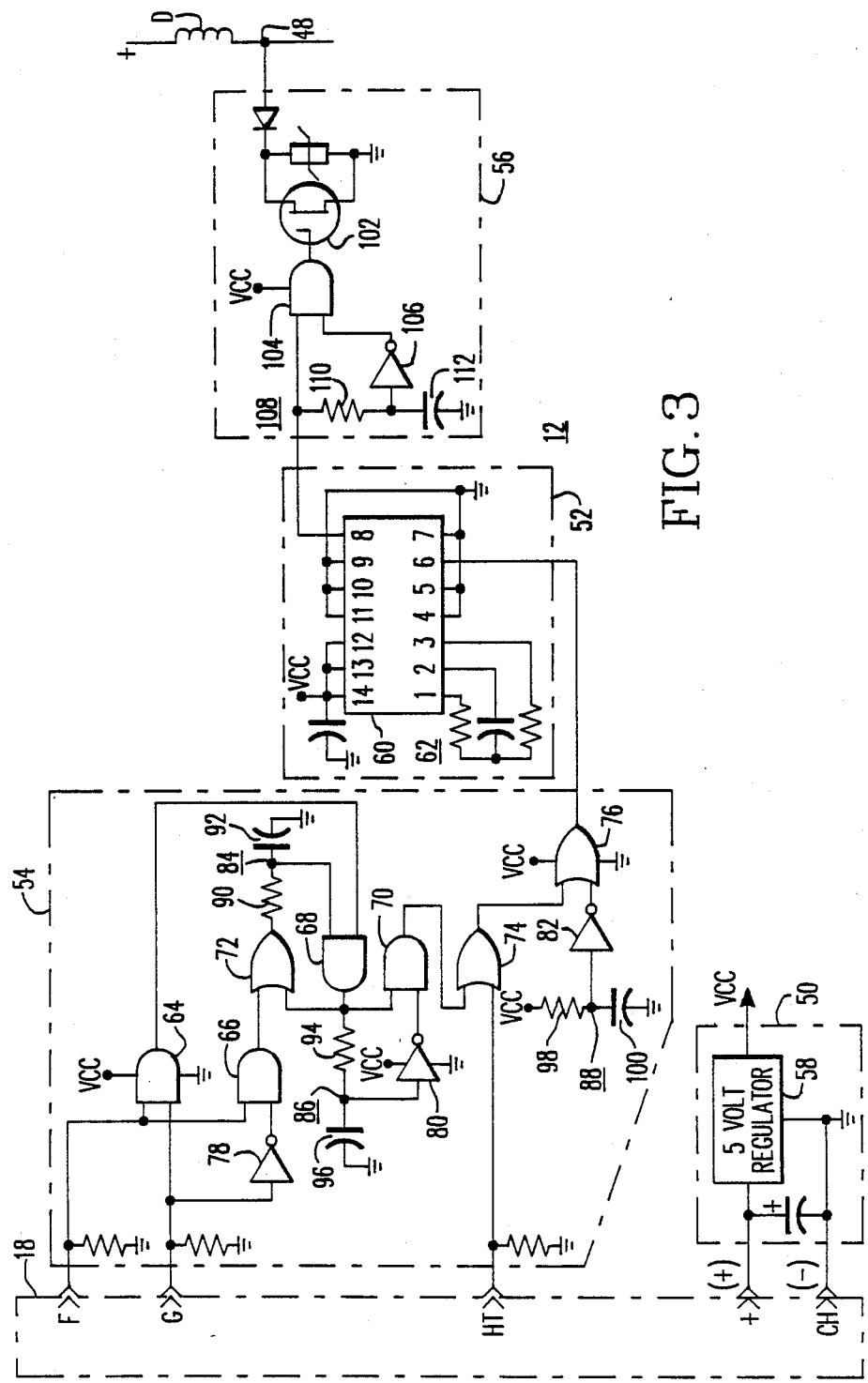
FIG. 3 is a detailed schematic diagram of defrost control constructed according to the teachings of the invention, which may be used for the defrost function shown in block form in FIG. 1.

Referring now to FIG. 3, defrost control 12 includes a power supply function 50, a timer function 52, a logic function 54, and an output driver function 56.

The power supply function 50 provides a regulated control voltage VCC via a voltage regulator 58 in response to the power supply inputs +and CH from thermostat 18.

The timer function 52 includes a programmable timer 60, such as timer CD4541BC, which provides a signal at output pin #8 for the output driver function 56 when a pre-programmed count is reached which signifies the need for a defrost operation. The logic levels applied to input pins #12 and #13 program or select the timing period of timer 60. Timer 60, when not held in a reset state by a high input to reset pin #6, will count pulses generated by an oscillator 62 connected to input pin numbers 1, 2 and 3.

The logic function 54 controls timer function 52 by providing a signal for reset pin #6 of timer 60 in response to logic signals F, G and HT from digital thermostat 18.. The logic function 54 applies a logic zero to pin #6 when timer 60 is allowed to accumulate a count, and it applies a logic one to pin #6 to clear and reset timer 60. Logic function 54 includes four dual input AND gates 64, 66, 68 and 70, three dual input OR gates 72, 74 and 76, three inverter gates 78, 80 and 82, and three RC circuits 84, 86 and 88. RC circuit 84 includes a resistor 90 and capacitor 92, RC circuit 86 includes a resistor 94 and a capacitor 96, and RC circuit 88 includes a resistor 98 and a capacitor 100.

The output driver function 56 includes a solid state switch in the form of an N-channel Hexfet 102, an AND gate 104, an inverter gate 106, and an RC circuit 108 which includes a resistor 110 and a capacitor 112.

Upon initial power up of defrost control 12, reset pin #6 of timer 60 will be momentarily held high by inverter gate 82 and the time constant delay of resistor 98 and capacitor 100. This will clear and reset timer 60 at power-up.

During a heat cycle, timer 60 will be held in a reset state by OR gates 74 and 76, as input signal HT provided by thermostat 18 will be high, providing high outputs at OR gates 74 and 76.

After the power-up reset, anytime thermostat 18 is requesting a cooling mode, i.e., signal HT is low, timer 60 will be allowed to accumulate a count. If the temperature of the served space 34 is responding properly, indicating the performance of the system 10 is not being impaired by frost build up on evaporator coil 26, logic function 54 will provide a reset pulse for timer 60 before timer reaches the end of the programmed count and provides a true or high output at it output pin #8. Logic function 54 responds not only to the direction of the changing temperature, but also to the rate at which a falling temperature is dropping.

Figure 4:
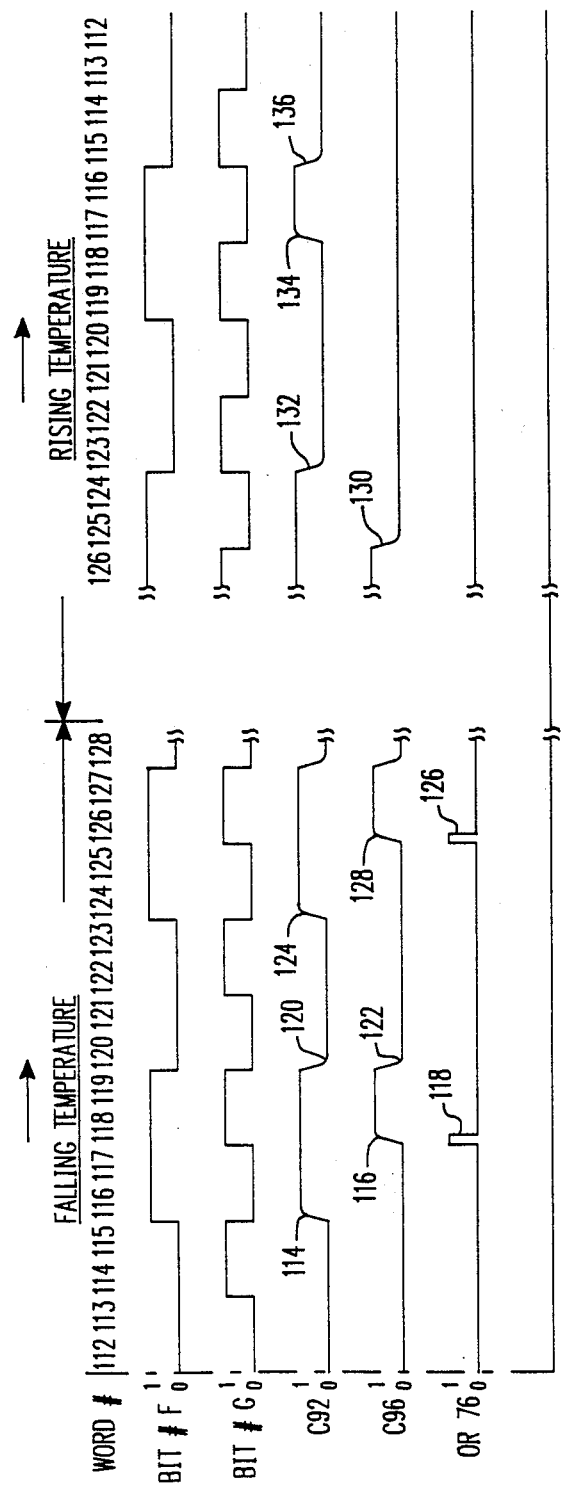
FIG. 4 is a timing diagram which is useful in understanding the operation of the schematic diagram shown in FIG. 3.

For the following explanation of logic function 54, the timing diagram of FIG. 4 will also be referred to. For purposes of explanation, it will be assumed that system 10 is in low speed cool with the temperature of the served space 34 dropping towards set point, and that thermostat digital signal A-H is at word #112. Bits F and G will both be low. Nothing happens circuit-wise until digital word 116 is reached, at which point bit F is high and bit G is low. AND gate 66 will have two high inputs, switching its output high, and the output of OR gate 72 goes high to charge capacitor 92, as indicated at point 114 in FIG. 4.

At the transition from digital word #117 to word #118, the time constant delay of RC circuit 84 will hold capacitor 92 high until the transition is complete. At word #118 both bits F and G will be high, and the output of AND gate 64 switches high to cause the output of AND gate 68 to switch high. Or gate 72 now has a high input to maintain the charge on capacitor 92. When AND gate 68 switches high it will cause the output of AND gate 70 to go high until the time delay constant of RC circuit 86 allows capacitor 96 to charge, indicated at 116 in FIG. 4, and apply a low input to AND gate 70 via inverter gate 80. The momentary high output of AND gate 70 switches OR gates 74 and 76 momentarily high to cause OR gate 76 to apply a high reset pulse 118 to reset pin #6 of timer 60. Timer 60 thus is cleared and reset to zero, to start accumulating another count. Capacitors 92 and 96 will both discharge, indicated at points 120 and 122 in FIG. 4, when bits F and G both go low at digital word #120. If the load temperature continues to drop correctly, capacitor 92 will re-charge at digital word #124, indicated at 124 in FIG. 4, a reset pulse 126 will be provided at digital word #126 and capacitor 96 will charge at 128 to terminate reset pulse 126.

Should it take too long for the temperature to drop from digital word #116 which charges capacitor 92 until reaching digital word #118, allowing timer 60 to accumulate the programmed count, output pin #8 of timer 60 will go high. AND gate 104 will have two high inputs until the delay provided by RC circuit 108 allows capacitor 112 to charge to the point where inverter gate 106 provides a low output. During the time AND gate 104 has two high inputs its output will be high, turning on Hexfet 102, which energizes the defrost relay D. Defrost relay D immediately seals in via its contact D-1, and the hereinbefore explained defrost cycle is initiated. Thus, defrost control 12 will not hang up system 10 in a defrost mode by continuously energizing the defrost relay D. Defrost control 12 merely initiates the normal defrost cycle of system 10, immediately resetting itself so it can again detect a need for defrost.

To illustrate that a reset pulse will only be produced during a falling temperature, it will be assumed that after reset pulse 126 is provided that the temperature starts to rise before digital word #128 is reached. Operation of defrost control 12 is illustrated on the right-hand side of FIG. 4. Capacitors 92 and 96 remain charged, with capacitor 96 discharging at digital word #125, indicated at 130 in FIG. 4, because the outputs of AND gates 64 and 68 both go low. AND gate 66 switches high to maintain the output of OR gate 72 high, preventing capacitor 92 from discharging at this point. The next bit change in the rising temperature direction, which occurs at digital word #123, instead of triggering a reset pulse, results in capacitor 92 discharging at 132 in FIG. 4. If the temperature continues to rise, capacitor 92 will re-charge at digital word #117, indicated at 134 but at the next bit change, which occurs at digital word #115, both input bits F and G will be low, discharging capacitor 134 at point 136 in FIG. 4, before both input bits go high again. Thus, no reset pulses are produced in response to a rising temperature, and timer 60 will time out.

When the evaporator coil 26 is covered with frost to the point where the temperature of the served space 34 rises, the temperature rise will normally be slow, and thus the defrost control 12 of the invention will initiate defrost well before the temperature is allowed to drift upwardly all the way to high speed cool, which occurs at a temperature of +5.1 degrees F. above set point in the present example. With a prior art air switch monitor, the defrost operation would wait until the system switches back to high speed cool at +5.1 degrees F., in order to realize a pressure drop which will operate the air switch.

In summary, the defrost control 12 of the present invention initiates defrosting of evaporator coil 26 only when defrost is required, providing more efficient operation of system 10. The defrost control 12 further eliminates the need for a separate defrost detector, such as an air switch, as it utilizes the thermostat 18 which is required to control system 10 to the selected set point temperature. Defrost control 12 will only provide a reset pulse for timer 60 when the temperature of the served space is being reduced towards set point, and it thus has directional sensitivity. Further, if the temperature is not dropping towards set point at the proper rate, reset pulse will not be produced before timer 60 times out. Thus, even when the temperature is moving in the proper direction, the rate-of-change aspect of the invention will be operative to allow timer 60 to time out and initiate defrost if the temperature rate-of-change does not exceed a predetermined rate. The predetermined rate is determined by the particular count to which timer 60 is programmed to count to, before timing out and providing a high output at output pin #8.

I claim:

1. A method of detecting the need to defrost an evaporator coil of a refrigeration system which draws air from a served space, conditions the air by heating and cooling cycles as required to control the air temperature to a predetermined set point, and returns the conditioned air to the served space, comprising the steps of:

measuring the air temperature of the served space for comparison with the set point temperature, and using the temperature measurement to detect the need to defrost the evaporator coil, with said using step including the steps of:

monitoring the direction and rate of change of the air temperature during a cooling cycle, and initiating defrost of the evaporator coil as a function of the direction and rate of change of the air temperature.

2. The method of claim 1 wherein the step of measuring the air temperature provides a digital signal, and the monitoring step includes the steps of providing reset signals at predetermined bit change patterns of the digital signal which can occur only as the air temperature changes towards set point, and measuring the time between reset signals, with the step of initiating defrost of the evaporator coil being responsive to the time measuring step.

3. In a transport refrigeration system which includes an evaporator coil, means for drawing air from a served space through the evaporator coil and returning the air to the served space, means for measuring the temperature of the air of the served space with a digital thermostat which provides a digital signal, and means for controlling the temperature of the air to a predetermined set point by heating and cooling cycles, the improvement comprising:

defrost means responsive to the digital signal for indicating the need to defrost the evaporator coil, said defrost means including a timer which provides a defrost signal when it times out, and means for resetting the timer responsive to predetermined bit change patterns of the digital signal which occur only when the temperature of the air is being reduced towards set point.

4. In the transport refrigeration system of claim 3, means for maintaining the timer in a reset condition during a heating cycle.

5. In the transport refrigeration system of claim 3, means for resetting the timer during initial application of electrical power to the defrost means.

6. In the transport refrigeration system of claim 3 wherein the means for resetting the timer responsive to predetermined bit change patterns of the digital signal include first and second RC circuits and logic means, with the first RC circuit being related to bit change pattern recognition, and with the second RC circuit providing are set pulse, notwithstanding the digital signal stalling in the pattern which initiated a reset signal.

* * * * *